(12) United States Patent
Yao et al.

(10) Patent No.: US 12,356,075 B2
(45) Date of Patent: Jul. 8, 2025

(54) IMAGE PROCESSING METHOD AND RELATED DEVICES

(71) Applicant: JINGDONG TECHNOLOGY INFORMATION TECHNOLOGY CO., LTD., Beijing (CN)

(72) Inventors: Xiujun Yao, Beijing (CN); Chenguang Gui, Beijing (CN); Zhetao Xu, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 147 days.

(21) Appl. No.: 18/252,981

(22) PCT Filed: Oct. 29, 2021

(86) PCT No.: PCT/CN2021/127539
§ 371 (c)(1),
(2) Date: May 15, 2023

(87) PCT Pub. No.: WO2022/105575
PCT Pub. Date: May 27, 2022

(65) Prior Publication Data
US 2023/0421905 A1    Dec. 28, 2023

(30) Foreign Application Priority Data

Nov. 18, 2020   (CN) .......................... 202011296431.9

(51) Int. Cl.
*H04N 23/695*    (2023.01)
*H04N 5/262*    (2006.01)
*H04N 23/56*    (2023.01)

(52) U.S. Cl.
CPC ........... *H04N 23/695* (2023.01); *H04N 5/262* (2013.01); *H04N 23/56* (2023.01)

(58) Field of Classification Search
CPC ...... H04N 23/695; H04N 5/262; H04N 23/56; H04N 23/698; H04N 23/60; H04N 5/265; H04N 23/951; G07C 1/20
See application file for complete search history.

(56) References Cited

U.S. PATENT DOCUMENTS 4,613,983 A    9/1986   Yedid et al.
5,986,279 A    11/1999   Dewaele
(Continued)

FOREIGN PATENT DOCUMENTS

CN    107220933 A    9/2017
CN    107464215 A    12/2017
(Continued)

OTHER PUBLICATIONS

English Translation CN-108683849-A (Year: 2018).*
(Continued)

*Primary Examiner* — Fernando Alcon
(74) *Attorney, Agent, or Firm* — Myers Bigel, P.A.

(57) ABSTRACT

This disclosure provides an image processing method, a controller, an image processing robot, and a non-transitory computer-readable storage medium, and relates to the technical field of robot. The image processing method includes: controlling a reference light source to project a reference line in a lengthwise direction of a photographed object; controlling a camera to move in the lengthwise direction of the photographed object to photograph different segments of the photographed object and obtain images of the segments of the photographed object, wherein each of the images contains a different segment of the reference line from each other; aligning the images by taking the segment of the reference line contained in the each of the images as a reference; and splicing the aligned images to obtain a whole image of the photographed object.

20 Claims, 5 Drawing Sheets

(56) References Cited

U.S. PATENT DOCUMENTS

| | | | |
|---|---|---|---|
| 10,699,376 B1* | 6/2020 | Kwok | B60R 1/28 |
| 2003/0048938 A1 | 3/2003 | Wang et al. | |
| 2011/0025854 A1* | 2/2011 | Yoshizumi | H04N 5/77 |
| | | | 348/169 |
| 2011/0058014 A1 | 3/2011 | Yamashita et al. | |
| 2012/0026283 A1* | 2/2012 | Kim | H04N 23/951 |
| | | | 348/E7.013 |
| 2014/0240451 A1 | 8/2014 | Sakano et al. | |
| 2016/0353012 A1* | 12/2016 | Kao | H04N 23/632 |
| 2019/0114775 A1* | 4/2019 | Ma | G06T 7/174 |
| 2020/0219044 A1* | 7/2020 | Roy | G06Q 10/087 |
| 2022/0247924 A1* | 8/2022 | Liu | H04N 23/698 |
| 2023/0103678 A1* | 4/2023 | Yuda | H04N 23/951 |
| | | | 348/148 |

FOREIGN PATENT DOCUMENTS

| | | | | |
|---|---|---|---|---|
| CN | 108683849 A | * | 10/2018 | H04N 5/23222 |
| CN | 110781903 A | | 2/2020 | |
| CN | 112492197 A | | 3/2021 | |
| CN | 113474788 B | * | 2/2024 | B64D 1/18 |
| EP | 0919858 A1 | | 6/1999 | |
| JP | H09161068 A | | 6/1997 | |
| JP | 2004117193 A | | 4/2004 | |
| JP | 2015060299 A | | 3/2015 | |
| JP | 2017118386 A | | 6/2017 | |
| JP | 2019043403 A | | 3/2019 | |
| KR | 102052013 B1 | * | 12/2019 | H04N 5/265 |
| WO | 2019045089 A1 | | 3/2019 | |
| WO | 2020187454 A1 | | 9/2020 | |
| WO | 2020220158 A1 | | 11/2020 | |

OTHER PUBLICATIONS

"International Search Report and Written Opinion of the International Searching Authority with English language translation", International Application No. PCT/CN2021/127539, Jan. 5, 2022, 14 pp.

"Notification to Grant Patent Right for Invention with English language translation", CN Application No. 202011296431.9, Oct. 20, 2021, 7 pp.

"Communication with Supplementary European Search Report", EP Application No. 21893723.3, Aug. 8, 2024, 10 pp.

Notice of Reasons for Refusal and English-language translation, JP Application No. 2023-530038, Apr. 15, 2025, 10 pp.

* cited by examiner

IMAGE PROCESSING METHOD AND RELATED DEVICES

CROSS-REFERENCE TO RELATED APPLICATIONS

The present disclosure is a U.S. National Stage Application under 35 U.S.C. § 371 of International Patent Application No. PCT/CN2021/127539, filed on Oct. 29, 2021, which is based on and claims priority of Chinese application for invention No. 202011296431.9 filed on Nov. 18, 2020, the disclosures of both of which are hereby incorporated into this disclosure by reference in its entirety.

TECHNICAL FIELD

This disclosure relates to the technical field of robot, and particularly, to an image processing method, a controller, an image processing robot, and a non-transitory computer-readable storage medium.

BACKGROUND

Development of information technology gives birth to a large-scale construction of Internet data machine rooms. In an Internet data machine room, 42 U cabinets are typically deployed. Each of the cabinets is about 2 meters high, and tens of computers are deployed in each of the cabinets.

An inspection robot in the Internet data machine room is an intelligent device for assisting or replacing manual execution of an inspection task in the Internet data machine room. The inspection robot generally photographs the computers in the cabinets using a camera, and judges working states of the computers by means of image recognition technology such as indicator light recognition and optical character recognition (OCR).

Due to a limitation in an angle of view of the camera, recognition of the working states of the computers in one cabinet usually needs to move the camera from bottom to top to photograph images of the cabinet at different heights, so that all the computers in the whole cabinet can be covered. After the photographing of the whole cabinet is finished, while generating a report of the working states of the computers, it is needed to splice the images of the cabinet at the different heights to generate a complete image of the cabinet.

SUMMARY

According to a first aspect of the present disclosure, there is provided an image processing method, comprising: controlling a reference light source to project a reference line in a lengthwise direction of a photographed object; controlling a camera to move in the lengthwise direction of the photographed object to photograph different segments of the photographed object and obtain images of the segments of the photographed object, wherein each of the images contains a different segment of the reference line from each other; aligning the images by taking the segment of the reference line contained in the each of the images as a reference; and splicing the aligned images to obtain a whole image of the photographed object.

In some embodiments, the reference light source is a near-infrared light source, and the reference line is a near-infrared reference line, and the aligning the images by taking the segment of the reference line contained in the each of the images as the reference comprises: converting the images into gray-scale images; aligning the gray-scale images by taking the segment of the near-infrared reference line contained in each of the gray-scale images as the reference; and converting the aligned gray-scale images into color images.

In some embodiments, the segment of the reference line is located at an edge of each of the images, and the image processing method further comprises: cropping the each of the images along the segment of the reference line.

In some embodiments, the lengthwise direction of the photographed object is a vertical direction, and the controlling the camera to move in the lengthwise direction of the photographed object comprises: sending a first control instruction to a lifting mechanism motor driver to control the lifting mechanism motor driver to drive a lifting mechanism to work and enable the lifting mechanism to drive the camera on a workbench to move in the vertical direction.

In some embodiments, the controlling the reference light source to project the reference line in the lengthwise direction of the photographed object comprises: sending a second control instruction to a light source driving circuit to control the light source driving circuit to drive the reference light source and enable the reference light source to project the reference line in the lengthwise direction of the photographed object through a slit.

According to a second aspect of the present disclosure, there is provided a controller, comprising: a reference line projection module configured to control a reference light source to project a reference line in a lengthwise direction of a photographed object; a camera control module configured to control a camera to move in the lengthwise direction of the photographed object to photograph different segments of the photographed object and obtain images of the segments of the photographed object, wherein each of the images contains a different segment of the reference line; an image alignment module configured to align the images by taking the segment of the reference line contained in the each of the images as a reference; and an image splicing module configured to splice the aligned images to obtain a whole image of the photographed object.

In some embodiments, the reference light source is a near-infrared light source, and the reference line is a near-infrared reference line, and the image alignment module is configured to convert the images into gray-scale images, align the gray-scale images by taking the segment of the near-infrared reference line contained in each of the gray-scale images as the reference, and convert the aligned gray-scale images into color images.

In some embodiments, the segment of the reference line is located at an edge of each of the images, and the controller further comprises an image cropping module configured to crop the each of the images along the segment of the reference line.

In some embodiments, the lengthwise direction of the photographed object is a vertical direction, and the camera control module is configured to send a first control instruction to a motor driver of a lifting mechanism to control the motor driver to drive the lifting mechanism to work and enable the lifting mechanism to drive a workbench on which the camera placed to move in the vertical direction.

In some embodiments, the reference line projection module is configured to send a second control instruction to a light source driving circuit to control the light source driving circuit to drive the reference light source and enable the reference light source to project the reference line in the lengthwise direction of the photographed object through a slit.

According to a third aspect of the present disclosure, there is provided an image processing robot, comprising: a reference light source; a camera; and a controller electrically connected to the reference light source and the camera and configured to control the reference light source to project a reference line in a lengthwise direction of a photographed object, control the camera to move in the lengthwise direction of the photographed object to photograph different segments of the photographed object and obtain images of the segments of the photographed object, wherein each of the images contains a different segment of the reference line, align the images by taking the segment of the reference line contained in the each of the images as a reference, and splice the aligned images to obtain a whole image of the photographed object.

In some embodiments, the reference light source is a near-infrared light source, and the reference line is a near-infrared reference line, and the controller is configured to convert the images into gray-scale images, align the gray-scale images by taking the segment of the near-infrared reference line contained in each of the gray-scale images as the reference, and convert the aligned gray-scale images into color images.

In some embodiments, the reference line segment is located at an edge of the image; and the controller is further configured to: crop the image along the reference line segment.

In some embodiments, the image processing robot further comprises: a lifting mechanism motor driver electrically connected to the controller; a lifting mechanism electrically connected to the lifting mechanism motor driver; and a workbench mechanically connected to the lifting mechanism, wherein the camera is fixed on the workbench, wherein the lengthwise direction of the photographed object is a vertical direction, and the controller is configured to send a first control instruction to the lifting mechanism motor driver to control the lifting mechanism motor driver to drive the lifting mechanism to work and enable the lifting mechanism to drive the camera on the workbench to move in the vertical direction.

In some embodiments, the image processing robot further comprises: a light source driving circuit electrically connected to the controller; and a slit located on a housing of the image processing robot, wherein the controller is configured to send a second control instruction to the light source driving circuit to control the light source driving circuit to drive the reference light source and enable the reference light source to project the reference line in the lengthwise direction of the photographed object through the slit.

In some embodiments, a lengthwise direction of the slit is the vertical direction.

In some embodiments, the image processing robot further comprises: a chassis motor driver electrically connected to the controller; a motion motor electrically connected to the chassis motor driver; and a power wheel electrically connected to the motion motor, wherein the controller is further configured to send a third control instruction to the chassis motor driver to control the chassis motor driver to drive the motion motor and enable the motion motor to rotate and drive the power wheel to rotate.

In some embodiments, the image processing robot further comprises a laser radar electrically connected to the controller, wherein the controller is further configured to perform positioning via the laser radar.

In some embodiments, the image processing robot further comprises an inertial navigation unit electrically connected to the controller, wherein the controller is further configured to navigate the image processing robot to an inspection coordinate point via the inertial navigation unit.

According to a fourth aspect of the present disclosure, there is provided another image processing robot, comprising: a memory; and a processor coupled to the memory, the processor being configured to perform, based on instructions stored in the memory, the above image processing method.

According to a fifth aspect of the present disclosure, there is provided a non-transitory computer-readable storage medium, wherein the non-transitory computer-readable storage medium has thereon stored computer instructions which, when executed by a processor, implement the above image processing method.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate embodiments of the present disclosure or technical solutions in related arts, the drawings that need to be used in the description of the embodiments or related arts will be briefly described below. It is obvious that the drawings in the following description are only some embodiments of the present disclosure, and for one of ordinary skill in the art, other drawings can be obtained according to these drawings without paying creative efforts.

DETAILED DESCRIPTION

The technical solutions in the embodiments of the present disclosure will be described clearly and completely with reference to the drawings in the embodiments of the present disclosure, and it is obvious that the embodiments described are only part of the embodiments of the present disclosure, rather than all of them. The following description of at least one exemplary embodiment is merely illustrative in nature and is in no way intended to limit this disclosure and its application or uses. All other embodiments, which are obtained by one of ordinary skill in the art based on the embodiments in the present disclosure without making creative efforts, are intended to be within the protection scope of the present disclosure.

Figure 1:
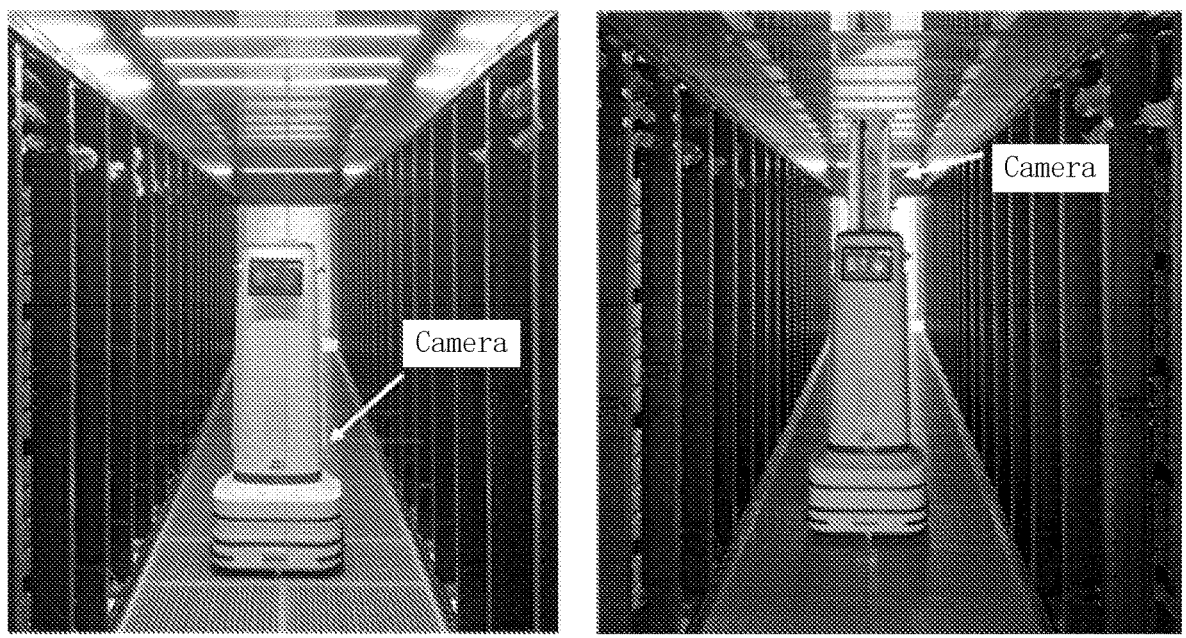
FIG. 1 shows a schematic diagram of an inspection robot inspecting in a machine room.
Figure 2:
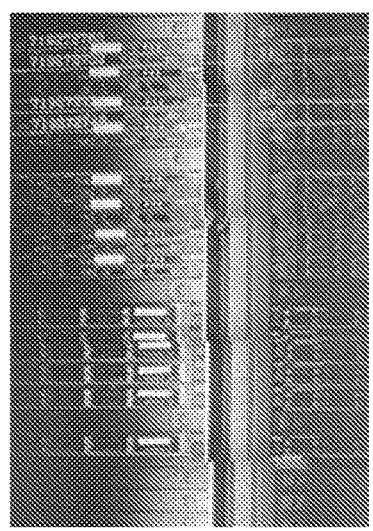
FIG. 2 shows a schematic diagram of a whole image of a cabinet that is spliced by an inspection robot.

FIG. 1 shows a schematic diagram of an inspection robot inspecting in a machine room. As shown in FIG. 1, since there are slight jitters in a process of ascent and descent (longitudinal movement) of a camera of the inspection robot, there are transverse displacements of the camera. In this way, when images of a cabinet at different heights are longitudinally spliced, there is a phenomenon of transverse misalignments between the images, so that a whole image of the cabinet that is spliced is in poor image quality, which affects visual effect. FIG. 2 shows a schematic diagram of a whole image of a cabinet that is spliced by an inspection robot.

In order to solve the above problem, the present disclosure provides an image processing method, which enables images of segments of a photographed object to be aligned, thereby improving the quality of the spliced image. The method will be discussed in detail below.

Some embodiments of the image processing method of the present disclosure are first described with reference to FIG. 3.

Figure 3:
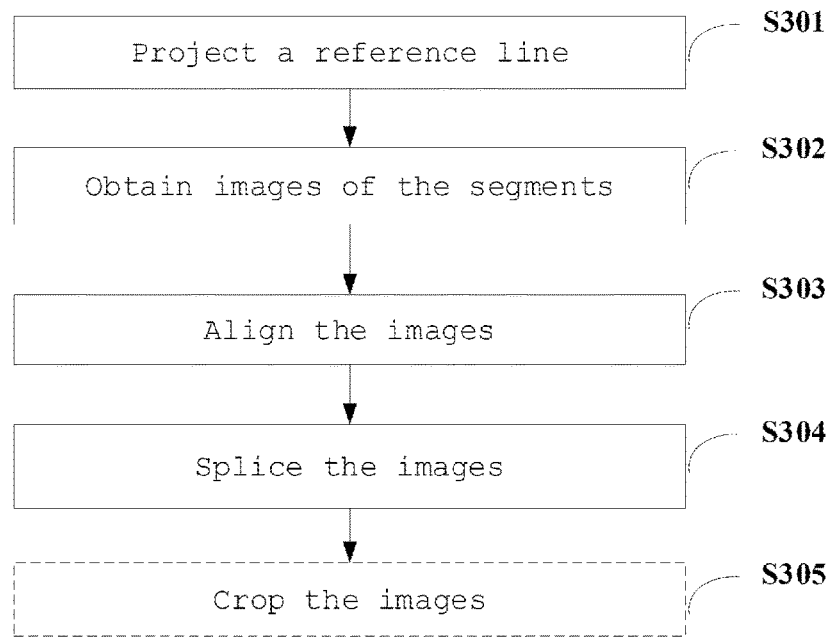
FIG. 3 shows a schematic flow diagram of an image processing method according to some embodiments of the present disclosure.

FIG. 3 shows a schematic flow diagram of an image processing method according to some embodiments of the present disclosure. As shown in FIG. 3, the method comprises steps S301 to S304.

In the step S301, a reference light source is controlled to project a reference line in a lengthwise direction of a photographed object.

For example, the reference light source is controlled to project a reference line in a vertical direction toward a cabinet. When the reference line is projected, a control instruction is sent to a light source driving circuit to control the light source driving circuit to drive the reference light source, so that the reference light source can project the reference line in the lengthwise direction of the photographed object through a slit.

In the step S302, a camera is controlled to move in the lengthwise direction of the photographed object to photograph different segments of the photographed object and obtain images of the segments of the photographed object, wherein each of the images contains a different segment of the reference line from each other.

In some embodiments, the lengthwise direction of the photographed object is a vertical direction. Correspondingly, in the step S302, a first control instruction can be sent to a lifting mechanism motor driver to control the lifting mechanism motor driver to drive a lifting mechanism to work and enable the lifting mechanism to drive the camera on a workbench to move in the vertical direction.

In the step S303, the images of the segments of the photographed object are aligned by taking the segment of the reference line contained in the each of the images of the segments of the photographed object as a reference.

Figure 4:
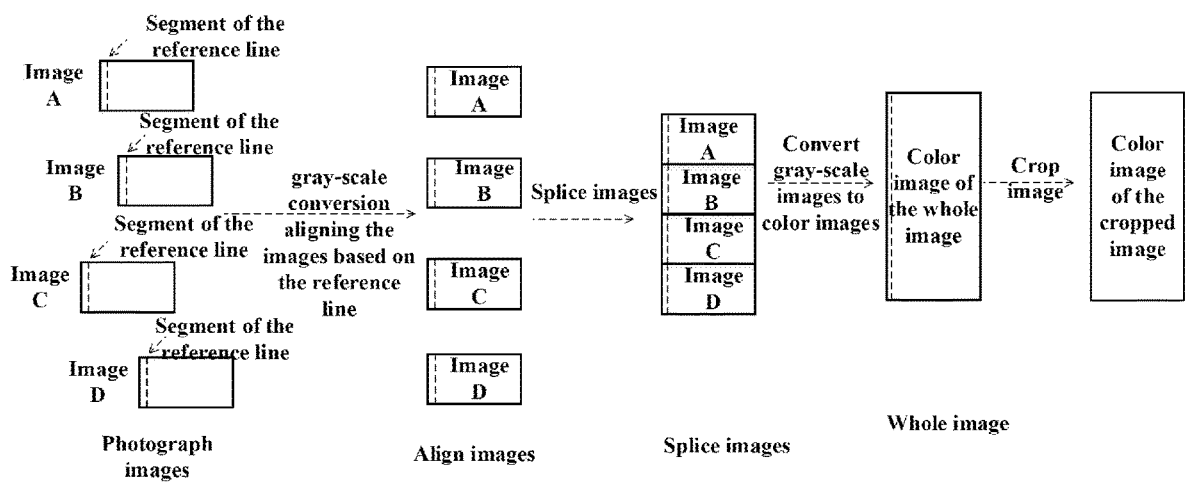
FIG. 4 shows a schematic diagram of aligning and splicing images of segments of a photographed object.

In some embodiments, the reference light source is a near-infrared light source, and the reference line is a near-infrared reference line. FIG. 4 shows a schematic diagram of aligning and splicing images of segments of a photographed object. As shown in FIG. 4, it is assumed that an image processing robot photographs segments of a photographed object to obtain four images A, B, C, D. Then, the image processing robot converts the images of the segments of the photographed object into gray-scale images, and retains color information (e.g., RGB color information) of the images of the segments of the photographed object before a gray-scale conversion. After the gray-scale conversion, the segments of the reference line projected by the near-infrared light source are very obviously different from other areas, and by taking the segment of the near-infrared reference line contained in each of the gray-scale images as the reference, the image processing robot aligns the gray-scale images, for example, aligns images of a cabinet photographed at different heights.

In the step S304, the aligned images are spliced to obtain a whole image of the photographed object.

When splicing the aligned images, the aligned gray-scale images are converted into color images by using the color information reserved before the gray-scale conversion, so that the whole color image of the cabinet is obtained.

In some embodiments, the image processing method further comprises step S305. In the step S305, the each of the images of the segments of the photographed object is cropped along the segment of the reference line. The segment of the reference line is located at an edge of each of the images. As shown in FIG. 4, when the spliced image is cropped, for example, an area on a left side of the reference line can be cropped out.

In the above embodiment, in a process of photographing the photographed object using the camera, the reference light source is controlled to project the reference line toward the photographed object. In this way, the camera can photograph the images of the segments of the photographed object, and each of the images contains a segment of the reference line. The images of the segments of the photographed object are spliced based on the segment of the reference line contained in each of the images to enable the images of the segments of the photographed object to be aligned more accurately, so that the image quality of the spliced image is improved.

Some embodiments of a controller of the present disclosure are described below with reference to FIG. 5.

Figure 5:
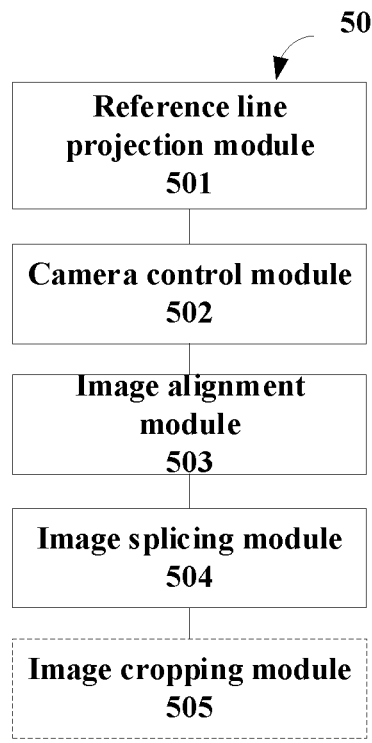
FIG. 5 shows a schematic structural diagram of a controller according to some embodiments of the present disclosure.

FIG. 5 shows a schematic flow diagram of a controller according to some embodiments of the present disclosure. As shown in FIG. 5, the controller 50 comprises: a reference line projection module 501 configured to control a reference light source to project a reference line in a lengthwise direction of a photographed object; a camera control module 502 configured to control a camera to move in the lengthwise direction of the photographed object to photograph different segments of the photographed object and obtain images of the segments of the photographed object, wherein each of the images contains a different segment of the reference line; an image alignment module 503 configured to align the images by taking the segment of the reference line contained in the each of the images as a reference; and an image splicing module 504 configured to splice the aligned images to obtain a whole image of the photographed object.

In some embodiments, the reference light source is a near-infrared light source, and the reference line is a near-infrared reference line and the image alignment module 503 is configured to convert the images into gray-scale images, align the gray-scale images by taking the segment of the near-infrared reference line contained in each of the gray-scale images as the reference, and convert the aligned gray-scale images into color images.

In some embodiments, the segment of the reference line is located at an edge of each of the images, and the controller 50 further comprises an image cropping module 505 configured to crop the each of the images along the segment of the reference line.

In some embodiments, the lengthwise direction of the photographed object is a vertical direction, and the camera control module 502 is configured to send a first control instruction to a motor driver of a lifting mechanism to control the motor driver to drive the lifting mechanism to work and enable the lifting mechanism to drive a workbench on which the camera placed to move in the vertical direction.

In some embodiments, the reference line projection module 501 is configured to send a second control instruction to a light source driving circuit to control the light source driving circuit to drive the reference light source and enable the reference light source to project the reference line in the lengthwise direction of the photographed object through a slit.

In the above embodiment, while controlling the camera to photograph the photographed object, the controller controls the reference light source to project the reference line towards the photographed object. In this way, the camera can photograph the images of the segments of the photographed object, and each of the images of the segments of the photographed object contains a segment of the reference line. The images of the segments of the photographed object are spliced based on the segment of the reference line contained in each of the images to enable the images of the segments of the photographed object to be aligned more accurately, so that the image quality of the spliced image is improved.

Some embodiments of an image processing robot of the present disclosure are described below with reference to FIG. 6.

Figure 6:
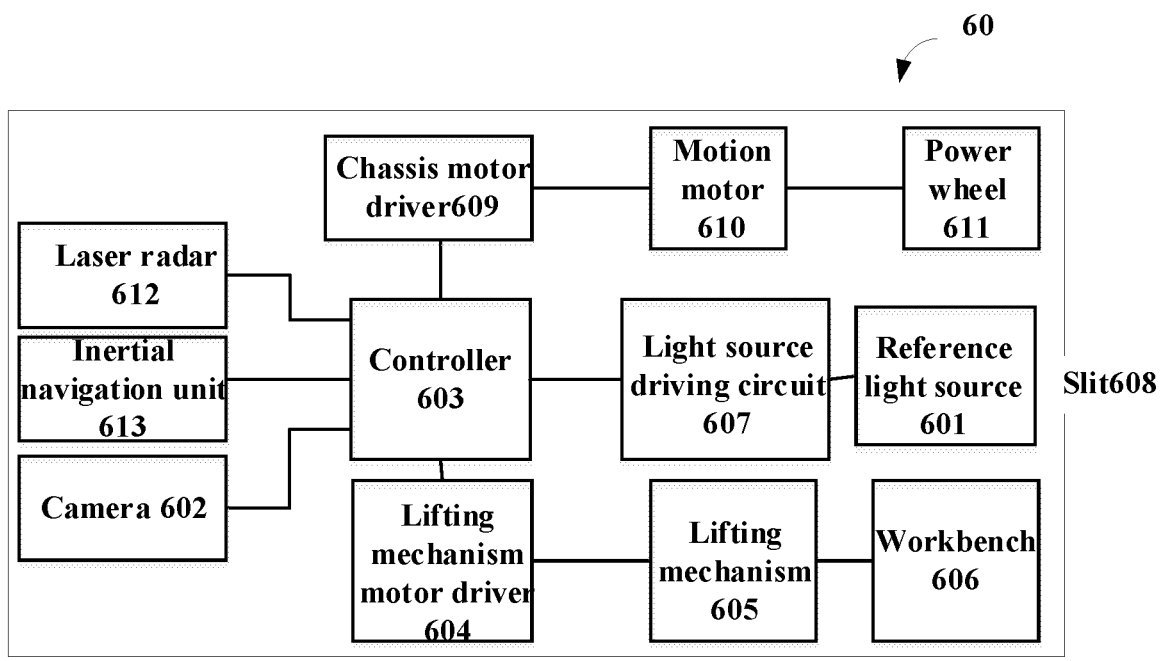
FIG. 6 shows a schematic structural diagram of an image processing robot according to some embodiments of the present disclosure.

FIG. 6 shows a schematic structural diagram of an image processing robot according to some embodiments of the present disclosure. As shown in FIG. 6, the image processing robot 60 comprises: a reference light source 601, a camera 602, and a controller 603 electrically connected to the reference light source 601 and the camera 602 and configured to control the reference light source 601 to project a reference line in a lengthwise direction of a photographed object, control the camera 602 to move in the lengthwise direction of the photographed object to photograph different segments of the photographed object and obtain images of the segments of the photographed object, wherein each of the images contains a different segment of the reference line, align the images by taking the segment of the reference line contained in the each of the images as a reference, and splice the aligned images to obtain a whole image of the photographed object.

In some embodiments, the reference light source 601 is a near-infrared light source, and the reference line is a near-infrared reference line, and the controller 603 is configured to convert the images into gray-scale images, align the gray-scale images by taking the segment of the near-infrared reference line contained in each of the gray-scale images as the reference, and convert the aligned gray-scale images into color images.

In some embodiments, the reference line segment is located at an edge of the image, and the controller 603 is further configured to crop the each of the images along the segment of the reference line.

In some embodiments, the image processing robot 60 further comprises: a lifting mechanism motor driver 604 electrically connected to the controller 603; a lifting mechanism 605 electrically connected to the lifting mechanism motor driver 604; and a workbench 606 mechanically connected to the lifting mechanism 605, the camera 602 being fixed onto the workbench 606, wherein the lengthwise direction of the photographed object is a vertical direction, and the controller 603 is configured to send a first control instruction to the lifting mechanism motor driver 604 to control the lifting mechanism motor driver 604 to drive the lifting mechanism 605 to work, and enable the lifting mechanism 605 to drive the camera 602 on the workbench 606 to move in the vertical direction.

In some embodiments, the image processing robot 60 further comprises: a light source driving circuit 607 electrically connected to the controller 603, a slit 608 located on a housing of the image processing robot, wherein the controller 603 is configured to send a second control instruction to the light source driving circuit 607 to control the light source driving circuit 607 to drive the reference light source 601, and enable the reference light source 601 to project the reference line in the lengthwise direction of the photographed object through the slit 608. Those skilled in the art can appreciate that the controller 603 sends different control instructions to the light source driving circuit 607 to turn on or off of the near-infrared light source.

In some embodiments, a lengthwise direction of the slit 608 is the vertical direction.

In the above embodiment, while controlling the camera to photograph the photographed object, the image processing robot controls the reference light source to project the reference line toward the photographed object. In this way, the camera can photograph the images of the segments of the photographed object, and each of the images of the segments of the photographed object contains a segment of the reference line. The images of the segments of the photographed object are spliced based on the segment of the reference line contained in each of the images to enable the images of the segments of the photographed object to be aligned more accurately, so that the image quality of the spliced image is improved.

Figure 7:
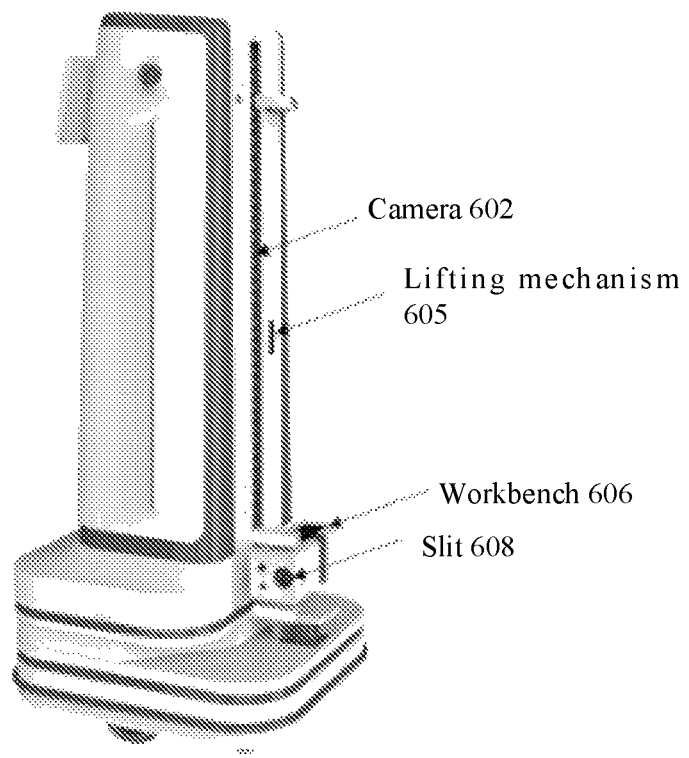
FIG. 7 shows a schematic physical diagram of an image processing robot.

FIG. 7 shows a schematic physical diagram of an image processing robot. As shown in FIG. 7, the reference light source 601 and the controller 603 are provided inside the housing of the image processing robot. In a case where the reference light source 601 is specifically the near-infrared light source, the reference light source 601 can project the near-infrared reference line. The lifting mechanism motor driver 604 can be provided inside or outside the housing of the image processing robot. The lifting mechanism 605 electrically connected to the lifting mechanism motor driver 604 is provided outside the housing of the image processing robot, for example, on a side of the housing of the image processing robot. The camera 602 is mounted on the workbench 606, and the workbench 606 can move up and down by means of the lifting mechanism 605. The controller 603, by sending the first control instruction to the lifting mechanism motor driver 604, can control the lifting mechanism motor driver 604 to drive the lifting mechanism 605 to work, so that the lift 605 drives the camera 602 on the workbench 606 to move in the vertical direction, to complete the photographing of segments (for example, the photographing of the images of the whole cabinet at different heights) of the photographed object.

The light source driving circuit 607 electrically connected to the controller 603 is also provided inside the housing of the image processing robot. The housing is provided with the slit 608, and a lengthwise direction of the slit 608 is the vertical direction. The controller 603, by sending the second control instruction to the light source driving circuit 607, can control the light source driving circuit 607 to drive the reference light source 601 so that the reference light source 601 projects the reference line in the vertical direction through the slit 608. A projection direction in which the reference light source 601 projects the reference line through the slit 608 is the same as a photographing direction of the camera. Those skilled in the art can appreciate that the controller 603 sends different control instructions to the light source driving circuit 607 to turn on or off of the near-infrared light source.

Figure 8:
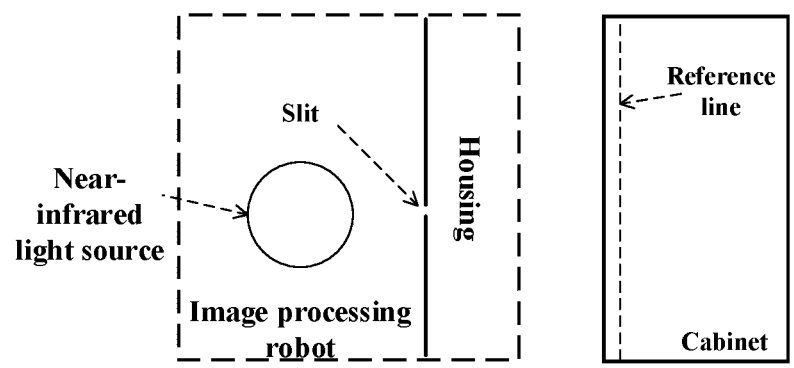
FIG. 8 shows a schematic diagram of projecting a reference line using a reference light source.

FIG. 8 shows a schematic diagram of projecting a reference line using a reference light source. As shown in FIG. 8, when the image processing robot is located at an inspection point in the machine room, the near-infrared light source can project a vertical reference line on the cabinet through the slit, and a plane where the reference line is located can be perpendicular to a surface of the cabinet. Those skilled in the art can appreciate that although the reference line projected by the near-infrared light source is invisible to human eyes, the camera can photograph the reference line projected by the near-infrared light source. Then, the controller sends a photographing instruction to the camera. After the camera finishes photographing one segment the photographed object, the controller sends the control instruction to the lifting mechanism motor driver to enable the workbench to move upwards for a fixed distance, and sends the photographing instruction to the camera again until the camera finishes photographing the images of the segments of the photographed object.

In some embodiments, the image processing robot 60 further comprises: a chassis motor driver 609 electrically connected to the controller 603; a motion motor 610 electrically connected to the chassis motor driver 609; and a power wheel 611 electrically connected to the motion motor 610, wherein the controller 603 is further configured to send a third control instruction to the chassis motor driver 609 to control the chassis motor driver 609 to drive the motion motor 610 and enable the motion motor 610 to rotate and drive the power wheel 611 to rotate.

The chassis motor driver 609, the motion motor 610, and the power wheel 611 form a power system of the image processing robot. The controller sends a control instruction to the chassis motor driver 609 and the chassis motor driver 609 controls the motion motor 610 to rotate, so that actions of the image processing robot, such as forward, backward, turn and the like, can be realized.

In some embodiments, the image processing robot 60 further comprises a laser radar 612 electrically connected to the controller 603, and the controller 603 is further configured to perform positioning by the laser radar 612.

In some embodiments, the image processing robot 60 further comprises an inertial navigation unit 613 electrically connected to the controller 603, and the controller 603 is further configured to navigate the image processing robot 60 to an inspection coordinate point by the inertial navigation unit 613.

Figure 9:
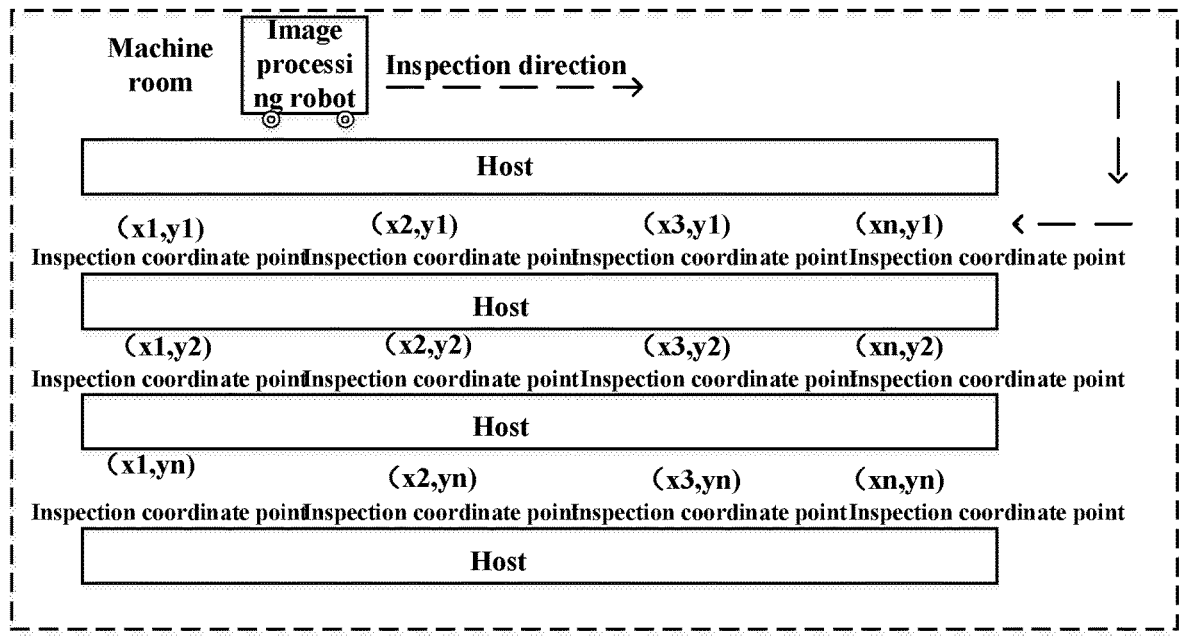
FIG. 9 shows a schematic diagram of an image processing robot inspecting in a machine room.

The laser radar 612 and the inertial navigation unit 613 form a navigation system of the inspection robot, for the image processing robot to perform positioning and navigation for itself in the machine room. FIG. 9 shows a schematic diagram of an image processing robot inspecting in a machine room. As shown in FIG. 9, the image processing robot executes an inspection task in the machine room according to a planned path, and when the image processing robot reaches a coordinate (xn, yn) of an inspection point (i.e. right in front of a cabinet that needs to be inspected), the image processing robot executes the above image processing method. After the image processing method is executed at the coordinate of the current inspection point, the controller sends a control instruction to the light source driving circuit to turn off the reference light source, and controls the image processing robot to move to a coordinate of a next inspection point.

In the embodiments provided in the present application, it should be understood that the disclosed technical content can be implemented in other manners. The apparatus embodiments described above are merely illustrative, for example, the division of the units can be a logical function division. In actual implementations, there can be other divisions, for example, multiple units or components can be combined or integrated into another system, or some features can be omitted or not executed. On the other hand, the shown or discussed coupling or direct coupling or communication connection with each other can be indirect coupling or communication connection via some interfaces, units or modules, and can be in an electrical or other forms.

The units described as separate components can be or not be physically separate, and the components displayed as the units can be or not be physical units, that is, they can be located in one position, or distributed on a plurality of units. Some or all of the units can be selected according to actual needs to achieve the purpose of the solution of the embodiment.

In addition, the function units in the embodiments of the present disclosure can be integrated into one processing unit, or each unit can exist alone physically, or two or more units are integrated into one unit. The above integrated units can be implemented in a form of hardware or a software function unit.

Other embodiments of the image processing robot of the present disclosure are described below with reference to FIG. 10.

Figure 10:
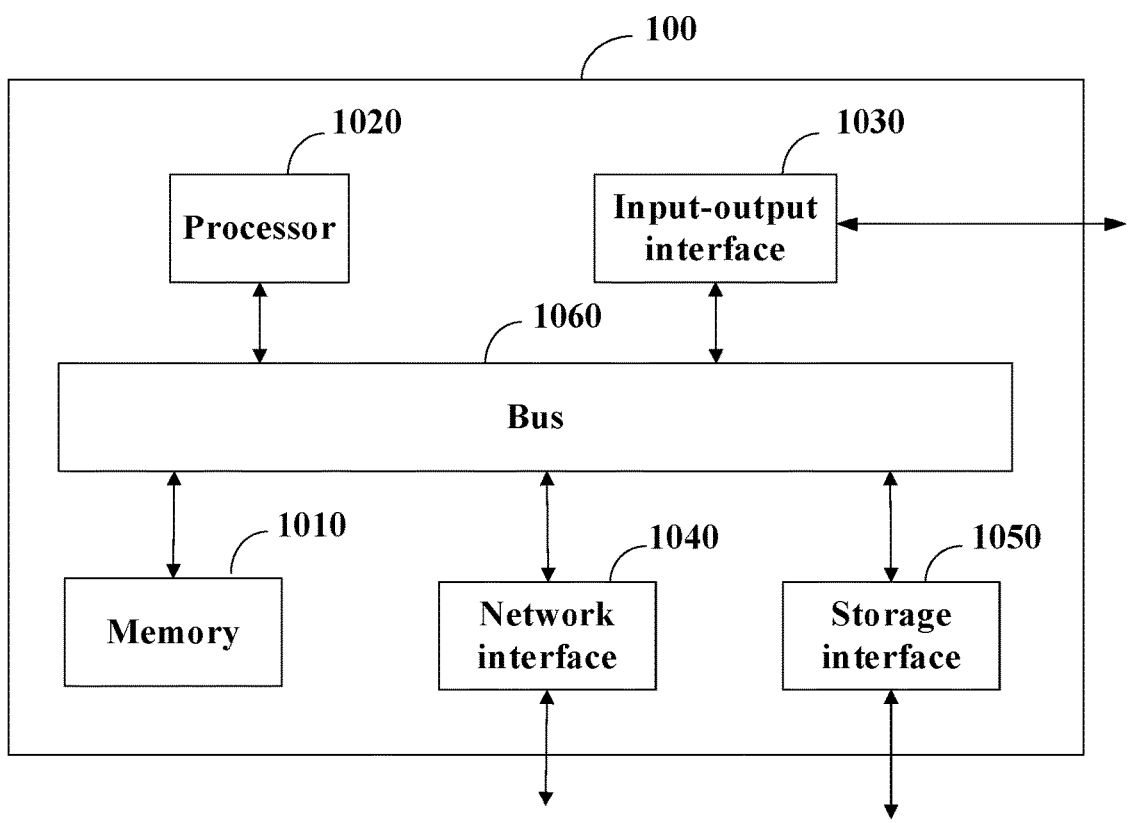
FIG. 10 shows a schematic structural diagram of an image processing robot according to other embodiments of the present disclosure.

FIG. 10 shows a schematic structural diagram of an image processing robot according to other embodiments of the present disclosure. As shown in FIG. 10, the image processing robot 100 comprises: a memory 1010 and a processor 1020 coupled to the memory 1010, the processor 1020 being configured to perform, based on instructions stored in the memory 1010, the image processing method in any of the embodiments.

The memory 1010 can comprise, for example, a system memory, a fixed non-volatile storage medium, and the like. The system memory has thereon stored, for example, an operating system, application, boot loader, other programs, and the like.

The image processing robot 100 can further comprise an input/output interface 1030, a network interface 1040, a storage interface 1050, and the like. These interfaces 1030, 1040, 1050 and the memory 1010 can be connected to the processor 1020, for example, via a bus 1060. The input/output interface 1030 provides a connection interface for input/output devices such as a display, a mouse, a keyboard, and a touch screen. The network interface 1040 provides a connection interface for various networking devices. The storage interface 1050 provides a connection interface for external storage devices such as an SD card and a USB flash disk.

The present disclosure further comprises a non-transitory computer-readable storage medium having thereon stored computer instructions which, when executed by a processor, implement the image processing method in any of the above embodiments.

The aforementioned integrated unit, if implemented in the form of a software function unit and sold or used as an independent product, can be stored in one computer-readable storage medium. Based on such understanding, the essence of the technical solution of the present disclosure, or the part thereof that contributes to the related art, or the whole or part of the technical solution, can be embodied in a form of a software product, which is stored in one storage medium and comprises several instructions for causing one computer device (which can be a personal computer, a server, a network device, or the like) to perform all or part of the steps of the method according to the embodiments of the present disclosure. The aforementioned storage medium comprises: various media capable of storing program code, such as a USB flash disk, a read-only memory (ROM), a random access memory (RAM), a mobile hard disk, a magnetic disk, or an optical disk.

The present disclosure has been described with reference to the flow diagrams and/or block diagrams of the method, device (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing the functions specified in one or more flows of the flow diagrams and/or one or more blocks of the block diagrams.

These computer program instructions can also be stored in a computer-readable memory that can guide a computer or other programmable data processing devices to work in a specific manner, such that the instructions stored in the computer-readable memory produce an article of manufacture comprising instruction means which implement the functions specified in one or more flows of the flow diagrams and/or one or more blocks of the block diagrams.

These computer program instructions can also be loaded onto a computer or other programmable data processing devices to cause a series of operation steps to be performed on the computer or other programmable devices to produce a computer-implemented process, such that the instructions, which are executed on the computer or other programmable devices, provide steps for implementing the functions specified in one or more flows of the flow diagrams and/or one or more blocks of the block diagrams.

It should be noted that the terms "first", "second", and the like in the description and claims of this application and the above accompanying drawings are used for distinguishing similar objects and not necessarily for describing a specific order or sequence. It should be understood that the data so used can be interchanged under appropriate circumstances in order to facilitate the description of the embodiments of the present application herein. Furthermore, the terms "comprise" and "have", and any variations thereof, are intended to cover a non-exclusive inclusion. For example, a process, method, system, product, or device that comprises a series of steps or units is not necessarily limited to those steps or units that are expressly listed, but can comprise other steps or units that are not expressly listed or are inherent to the process, method, product, or device.

It should also be noted that the term "comprise", "include", or any other variation thereof, is intended to cover a non-exclusive inclusion, such that a process, method, product, or device that comprises a series of elements, not only comprises those elements, but also comprises other elements not expressly listed or elements inherent to such process, method, product, or device. Without more limitations, an element defined by the phrase "comprising one . . . " does not exclude the presence of other identical elements in a process, method, product, or device that comprises the element.

The above description is only the preferred embodiments of the present disclosure, and is not used for limiting the present disclosure, and any modification, equivalent replacement, improvement and the like that are made within the spirit and principles of the present disclosure are intended to be comprised the protection scope of the present disclosure.

What is claimed is:

1. An image processing method, comprising:
   controlling a reference light source to project a reference line in a lengthwise direction of a photographed object;
   controlling a camera to move in the lengthwise direction of the photographed object to photograph different segments of the photographed object and obtain images of the segments of the photographed object, wherein each of the images contains a different segment of the reference line from each other;
   aligning the images by taking the segment of the reference line contained in the each of the images as a reference; and
   splicing the aligned images to obtain a whole image of the photographed object.

2. The image processing method according to claim 1, wherein the reference light source is a near-infrared light source, and the reference line is a near-infrared reference line, and the aligning the images by taking the segment of the reference line contained in the each of the images as the reference comprises:
   converting the images into gray-scale images;
   aligning the gray-scale images by taking the segment of the near-infrared reference line contained in each of the gray-scale images as the reference; and
   converting the aligned gray-scale images into color images.

3. The image processing method according to claim 1, wherein the segment of the reference line is located at an edge of each of the images, and the image processing method further comprises:
   cropping the each of the images along the segment of the reference line.

4. The image processing method according to claim 1, wherein the lengthwise direction of the photographed object is a vertical direction, and the controlling the camera to move in the lengthwise direction of the photographed object comprises:
   sending a first control instruction to a lifting mechanism motor driver to control the lifting mechanism motor driver to drive a lifting mechanism to work and enable the lifting mechanism to drive the camera on a workbench to move in the vertical direction.

5. The image processing method according to claim 1, wherein the controlling the reference light source to project the reference line in the lengthwise direction of the photographed object comprises:
   sending a second control instruction to a light source driving circuit to control the light source driving circuit to drive the reference light source and enable the reference light source to project the reference line in the lengthwise direction of the photographed object through a slit.

6. An image processing robot, comprising:
   a reference light source;
   a camera; and
   a controller electrically connected to the reference light source and the camera and configured to control the reference light source to project a reference line in a lengthwise direction of a photographed object, control the camera to move in the lengthwise direction of the photographed object to photograph different segments of the photographed object and obtain images of the segments of the photographed object, wherein each of the images contains a different segment of the reference line, align the images by taking the segment of the reference line contained in the each of the images as a reference, and splice the aligned images to obtain a whole image of the photographed object.

7. The image processing robot according to claim 6, wherein:

the reference light source is a near-infrared light source, and the reference line is a near-infrared reference line, and the controller is configured to convert the images into gray-scale images, align the gray-scale images by taking the segment of the near-infrared reference line contained in each of the gray-scale images as the reference, and convert the aligned gray-scale images into color images; and/or the segment of the reference line is located at an edge of each of the images and the controller is further configured to crop the each of the images along the segment of the reference line.

8. The image processing robot according to claim 6, further comprising:

a lifting mechanism motor driver electrically connected to the controller;

a lifting mechanism electrically connected to the lifting mechanism motor driver; and a workbench mechanically connected to the lifting mechanism, wherein the camera is fixed on the workbench, wherein the lengthwise direction of the photographed object is a vertical direction, and the controller is configured to send a first control instruction to the lifting mechanism motor driver to control the lifting mechanism motor driver to drive the lifting mechanism to work and enable the lifting mechanism to drive the camera on the workbench to move in the vertical direction.

9. The image processing robot according to claim 6, further comprising:

a light source driving circuit electrically connected to the controller; and a slit located on a housing of the image processing robot, wherein the controller is configured to send a second control instruction to the light source driving circuit to control the light source driving circuit to drive the reference light source and enable the reference light source to project the reference line in the lengthwise direction of the photographed object through the slit.

10. The image processing robot according to claim 9, wherein a lengthwise direction of the slit is the vertical direction.

11. The image processing robot according to claim 6, further comprising:

a chassis motor driver electrically connected to the controller;

a motion motor electrically connected to the chassis motor driver; and a power wheel electrically connected to the motion motor, wherein the controller is further configured to send a third control instruction to the chassis motor driver to control the chassis motor driver to drive the motion motor and enable the motion motor to rotate and drive the power wheel to rotate.

12. The image processing robot according to claim 6, further comprising:

a laser radar electrically connected to the controller, wherein the controller is further configured to perform positioning via the laser radar.

13. The image processing robot according to claim 12, further comprising:

an inertial navigation unit electrically connected to the controller, wherein the controller is further configured to navigate the image processing robot to an inspection coordinate point via the inertial navigation unit.

14. An image processing robot, comprising:

a memory; and a processor coupled to the memory, the processor being configured to perform the image processing method according to claim 1, based on instructions stored in the memory.

15. A non-transitory computer-readable storage medium, wherein the non-transitory computer-readable storage medium has thereon stored computer instructions which, when executed by a processor, cause the processor to implement the image processing method according to claim 1.

16. The image processing robot according to claim 14, wherein the reference light source is a near-infrared light source, and the reference line is a near-infrared reference line, and the aligning the images by taking the segment of the reference line contained in the each of the images as the reference comprises:

converting the images into gray-scale images;

aligning the gray-scale images by taking the segment of the near-infrared reference line contained in each of the gray-scale images as the reference; and converting the aligned gray-scale images into color images.

17. The image processing robot according to claim 14, wherein the segment of the reference line is located at an edge of each of the images, and the image processing method further comprises:

cropping the each of the images along the segment of the reference line.

18. The image processing robot according to claim 14, wherein the lengthwise direction of the photographed object is a vertical direction, and the controlling the camera to move in the lengthwise direction of the photographed object comprises:

sending a first control instruction to a lifting mechanism motor driver to control the lifting mechanism motor driver to drive a lifting mechanism to work and enable the lifting mechanism to drive the camera on a workbench to move in the vertical direction.

19. The image processing robot according to claim 14, wherein the controlling the reference light source to project the reference line in the lengthwise direction of the photographed object comprises:

sending a second control instruction to a light source driving circuit to control the light source driving circuit to drive the reference light source and enable the reference light source to project the reference line in the lengthwise direction of the photographed object through a slit.

20. The non-transitory computer-readable storage medium according to claim 15, wherein the reference light source is a near-infrared light source, and the reference line is a near-infrared reference line, and the aligning the images by taking the segment of the reference line contained in the each of the images as the reference comprises:

converting the images into gray-scale images;

aligning the gray-scale images by taking the segment of the near-infrared reference line contained in each of the gray-scale images as the reference; and converting the aligned gray-scale images into color images.

\* \* \* \* \*